United States Patent [19]
Copeland

[11] 3,949,684
[45] Apr. 13, 1976

[54] METHOD FOR OXIDATION OF SULFUR-CONTAINING SUBSTANCES

[75] Inventor: George G. Copeland, Western Springs, Ill.

[73] Assignee: Copeland Systems, Inc., Oak Brook, Ill.

[22] Filed: Feb. 11, 1975

[21] Appl. No.: 548,918

Related U.S. Application Data

[63] Continuation-in-part of Ser. No. 392,638, Aug. 29, 1973, abandoned.

[52] U.S. Cl. ............... 110/1 J; 48/197 R; 110/28 J; 252/455 R; 423/244; 423/556
[51] Int. Cl.² ...................... F23J 1/00; C01B 17/14
[58] Field of Search.......... 48/197 R, 200, 201, 202, 48/210, 212, 215; 252/455 R; 423/244, 242, 556; 110/28 J, 1 J; 122/4 D

[56] References Cited
UNITED STATES PATENTS

| | | | |
|---|---|---|---|
| 3,580,702 | 5/1971 | Meyers et al. | 423/244 |
| 3,776,854 | 12/1973 | Dautzenberg et al. | 423/244 |

FOREIGN PATENTS OR APPLICATIONS

| | | | |
|---|---|---|---|
| 1,183,937 | 3/1970 | United Kingdom | 48/197 R |

Primary Examiner—S. Leon Bashore
Assistant Examiner—George C. Yeung
Attorney, Agent, or Firm—Merriam, Marshall, Shapiro & Klose

[57] ABSTRACT

A method for reducing the sulfur oxide content of a gaseous effluent resulting from the oxidation of sulfur-containing materials, such as fuels, which method provides for oxidation of such materials in a fluidized bed reactor in the presence of one or more metallic oxides reactive with sulfur oxides to form metallic sulfates. The method is carried out at temperatures sufficient to effect substantial oxidation of the sulfur in sulfur-containing substances yet insufficient to melt or dissociate appreciable amounts of the metallic sulfate reaction products formed.

The method is particularly useful in the oxidation of coal using an alumina bearing non-refractory clay. Gaseous sulfur oxides released in the oxidation of coal under the conditions described in the invention will combine with the alumina content of the clay to form aluminum sulfate which remains in the bed medium along with coal ash and other non-combustible materials.

9 Claims, 1 Drawing Figure

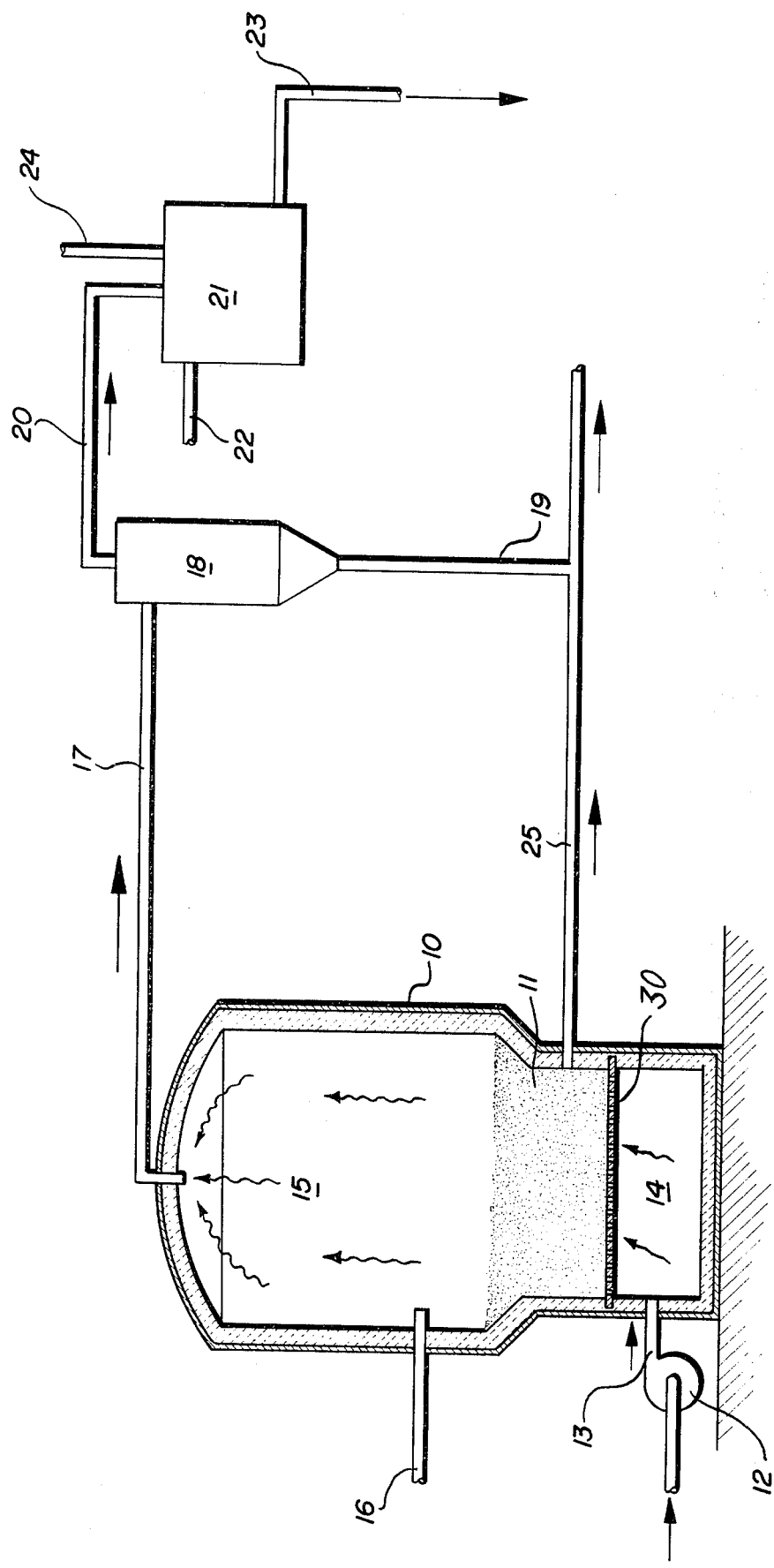

METHOD FOR OXIDATION OF SULFUR-CONTAINING SUBSTANCES

This application is a continuation-in-part of my copending application Ser. No. 392,638 filed Aug. 29, 1973, now abandoned.

BACKGROUND OF THE DISCLOSURE

The present invention relates to the control of atmospheric pollution through practice of methods of reduction of the sulfur oxide content of a gaseous effluent produced in the oxidation of a sulfur-containing substance.

Normal by-products of the process of oxidation of sulfur-containing substances (e.g., the burning of coal, fuel oil, and sour natural gases and the smelting of mineral ores such as chalcopyrite) are gaseous oxides of sulfur such as sulfur dioxide and, to a lesser extent, sulfur trioxide. Discharge of gaseous effluents of such processes constitutes a major air pollution hazard. Sulfur dioxide is reactive with atmospheric water, forming sulfurous acid, and has been known to react with atmospheric oxygen to form sulfur trioxide in the presence of catalytic amounts of lead air pollution. Sulfur trioxide is similarly reactive with atmospheric water, forming hazardous sulfuric acid.

Numerous processes have been developed in an attempt to remove sulfur oxides from gaseous effluents through treatment of the effluents prior to their release into the atmosphere. A typical method of treatment includes passing an $SO_2$ containing effluent through water. While this method has the effect of reducing the $SO_2$ content of an effluent, it gives rise to a sulfurous acid by-product, the disposal of which is in itself problematical. Generally, the methods heretofore available have not efficiently solved the pollution problems attendant to the oxidation of sulfur-containing substances.

The present invention relates to methods for reducing the sulfur oxide content of such gaseous effluents through providing for reaction of sulfur oxides, formed during oxidation of sulfur-containing materials, with metal oxides substantially concurrently with the oxidation process, at the oxidation site. The sulfur content is converted to sulfur trioxide which then reacts with the metal oxide to form a metal sulfate. Such reaction is effected as a result of carrying out the oxidation process in a fluidized bed reactor containing a particle bed of one or more reactive metal oxides in the presence of a stoichiometric excess of oxygen. The metal sulfate reaction products formed are ordinarily quite easily disposed of without attendant pollution hazards and, in certain cases, may constitute desirable end-products recoverable for other uses.

For the purposes of the present invention a reactive metal oxide may be defined as one which will react with sulfur oxides to form sulfate salts at temperatures below the dissociation temperature of those sulfates.

The methods of the present invention include providing one or more metal oxides as a portion of the particulate component of the fluidized reactor bed. The oxide may be provided in a substantially purified form or it may be supplied as a component of an aggregate material such as a suitable clay. Further, it is within the scope of the invention to provide at least part of the reactive metal oxide as a portion of the gross aggregate of material which forms the sulfur-containing substance to be oxidized. This last manner of introduction of the metal oxide may be employed, for example, if coal is the material to be oxidized, by feeding coal directly into the reactor without the standard preliminary stripping of metal oxide-containing clay from the coal.

The temperature maintained in the reactor is subject to variation, depending upon the sulfur-containing substance to be oxidized and the metal oxide employed to react with sulfur oxides. Generally, the reaction temperature is maintained above that needed to effect substantial oxidation of the sulfur to one or more sulfur oxides, yet below that which would dissociate the metal sulfate reaction product which is formed. Thus, for example, if a material such as coal is to be oxidized and the reactive metal oxide employed is the alumina constituent of a suitable clay, the temperature would be maintained above about 1200°F. but below about 1400°F.

BRIEF DESCRIPTION OF THE DRAWING

Further aspects and advantages of the present invention will be apparent upon consideration of the following detailed description of the preferred embodiment thereof along with the drawing. The drawing is a simplified diagrammatic illustration of apparatus suitable for performance of the method of the invention in the oxidation of a sulfur-containing substance such as coal, lignite, oil-shale, tar-sand, peat, fuel oil or natural gas.

DETAILED DESCRIPTION

The drawing illustrates apparatus suitable for the practice of the present invention when coal, fuel oil, natural gas, lignite, peat, tar-sand or oil-shale constitutes the sulfur-containing substance to be oxidized and includes a fluidized bed reactor 10 of the type described in U.S. Pat. No. 3,309,262 issued Mar. 14, 1967. Reactor 10 includes particle bed 11 which is fluidized by air under pressure fed from pump 12 through conduit line 13 into the windbox or plenum chamber 14 for passage through constriction plate 30 into fluidized bed 11 and then into the reactor freeboard space 15. Air passing through particle bed 11 keeps the particles therein in a state of fluid motion, presenting large surface areas for oxidation of sulfur-containing substances fed into the bed.

When coal, lignite, oil-shale, tar-sand or peat is the sulfur-containing material, the bed 11 can be a mixture of clay and ash residue from the material. However, a bed of sand and clay is generally suitable for use with oil or natural gas. Ordinarily, particles in the bed are of an average size below one-quarter inch and preferably have an average size of about 8–100 mesh as measured on a Tyler standard screen.

In the embodiment illustrated, the sulfur-containing substance to be oxidized is fed into the reactor through conduit 16. As earlier indicated, the reactive metal oxide material employed in the method of the present invention may either form part of the initial particulate bed 11 or it may be introduced as a part of the aggregate material to be oxidized. Oxidation of the sulfur-containing substance gives rise to sulfur-oxides which react in the bed to form a metal sulfate.

The gaseous products of oxidation in the bed, as well as some elutriated finely divided solids, leave the reactor through exit conduit 17 into dust separator 18. Dust separator 18 is preferably of the cyclone type and operates to remove particulate material from the gaseous effluent of reactor 10. Particulate material is exhausted from separator 18 through conduit 19.

The gaseous effluent, purified of particulate material, may be passed through conduit 20 to waste heat boiler 21 or a like device for utilizing the heat of the gaseous effluent. Waste heat boiler 21 is ordinarily provided with water feed conduit 22 and heated water or steam is removed by exhaust conduit 24. When steam is formed it can be used to drive a turbine-generator to produce electrical power. The cooled gaseous effluent exits through exhaust conduit 23.

Excess residual material from the oxidation of the sulfur-containing feed stream and metal sulfate formed from the reaction of sulfur dioxide with the metal oxide is removed from the bed 11 through exit conduit 25 and combined with similar finely divided particulate material separated from the effluent in separator 18.

Generally speaking, practice of the method of the invention is most efficiently carried out when one or more metal oxides are provided in an amount in stoichiometric excess of that necessary to effect reaction of substantially all sulfur oxides formed in the course of oxidation of the sulfur-containing substance.

Metal oxides suitable for use in the methods of the invention may include the oxides of sodium, potassium, aluminum, barium, cadmium, calcium, copper, iron, lead, magnesium, manganese and zinc.

It is also noted that other metal oxides may have a more limited utility than others with respect to practice of the invention in some oxidative processes. $Fe_2O_3$, for example, is reactive with $SO_3$ to form $Fe_2(SO_4)_3$ and thus is suitable for use in the method of the invention. The sulfate reaction product, however, dissociates at about 896°F., and thus may have limited utility in those instances wherein it is desirable to maintain reactor temperatures in excess of 875°–900°F. in order to provide for complete oxidation of sulfur, carbon, and/or other elements to be oxidized in a particular sulfur-containing substance.

Similarly, CuO, which forms a sulfate dissociating at 1112°F., may have a correspondingly limited utility depending upon the oxidation process to be carried out.

Generally, preferably reactive metal oxides for use in the invention are those which are available in large quantities as a part of inexpensive aggregate particulate materials. Alumina is such an oxide since it is a principal component of non-refractory clay, and feldspar. By "non-refractory clay" is meant a clay which contains a metal ion, usually in the form of a metal oxide, which reacts with gaseous sulfur oxides to form a metal sulfate.

Since non-refractory clays containing alumina are plentiful, alumina is available in large quantities in a "crude" form which is especially suitable for use in the bed of a fluidized bed reactor. Alumina-containing non-refractory clay, or feldspar, may be provided to the bed in a particle size permitting large surface areas containing alumina to be exposed for reaction with sulfur oxides generated in the course of oxidation of sulfur-containing substances.

The subject invention is particularly useful in the oxidation or gasification of sulfur-containing coal which leads to an effluent containing gaseous sulfur oxides because the fluidized bed can constitute such a plentiful low cost material as non-refractory clay. Furthermore, the clay can be introduced into the bed with the coal by simply using coal which includes some of the normally occurring clay present commonly or naturally with the coal seam or layer when it is mined. This technique can make it unnecessary to separately mine clay for use in the fluidized bed reactor when coal is oxidized or gasified. However, coal ash containing alumina or other metal oxides can be used alone as a starting bed if desired.

As the amount of aluminum sulfate, or other metal sulfate, and ash builds up in the reactor it can be removed intermittently or even continuously and clay, or other non-aluminum metal oxide, added separately or with the coal or other fuel to maintain the fluid bed volume.

It is recognized that, when an aggregate substance such as a non-refractory clay is employed as an alumina source, other metals present in the clay may to some extent participate in a sulfate-forming reaction with sulfur oxides. It will be appreciated, however, that temperature parameters may be set with regard to providing for optimal sulfur oxides removal by formation of aluminum sulfate rather than by way of other metal sulfates formed. Thus, if non-refractory clay containing small amounts of potassium is employed as an alumina source, it is possible that some amount of potassium sulfate might be formed. However, since the dissociation temperature of potassium sulfate is above that of the maximum operating temperature of about 1400°F. needed in practicing this process, the presence of this small quantity of metal oxide does not in any way substantially affect the basis of the invention.

The following example is presented to further illustrate the invention.

EXAMPLE

To a fluidized bed reactor 10 containing a bed 11 of alumina, is fed 2000 lbs/hr of coal, 31 lbs/hr of alumina and 9870 lbs/hr of water and the temperature maintained at 1300°F. in the reactor bed. The water was supplied as a liquid to keep the temperature from rising. The coal contains 1.6% sulfur, 7.8% ash, 2.4% water, 75.8% carbon, 5.1% hydrogen, 8.2% oxygen and 1.5% nitrogen, with a heating value of 13,560 btu/lb.

To obtain total combustion of the 2000 lbs/hr of coal a stream of 24,738 lbs/hr of air admixed with 351 lbs/hr of water vapor is fed by conduit 13 into the windbox and through constriction plate 30.

A hot gas stream containing 19,078 lbs/hr of nitrogen, 949 lbs/hr of oxygen, 5,559 lbs/hr of carbon dioxide, 6 lbs/hr of sulfur dioxide and 11,138 lbs/hr of water vapor is removed from the reactor by means of exit conduit 17 together with about 156 lbs/hr of ash and 104 lbs/hr of aluminum sulfate for each 2000 lbs/hr of coal burned. The aluminum sulfate is formed by reaction of the sulfur oxides in the combustion gas with alumina in the fluidized bed. About 95% of the ash and aluminum sulfate are separated in cyclone 18 and are then removed from it by conduit 19. The hot gases provide about 28,000,000 btu/hr to waste heat boiler 21 which is used to convert water fed thereto into steam for use in generating electricity by means of a steam driven turbine which drives a generator.

Obviously, many modifications and variations of the above-described invention may be made without departing from the spirit and scope thereof. Therefore, only such limitations as are indicated in the appended claims shall be placed thereon.

I claim:

1. A method for oxidation of a sulfur-containing carbonaceous substance wherein the sulfur oxide content of the gaseous effluent of such oxidation is reduced, said method comprising:
   introducing said sulfur-containing substance to be oxidized into a reactor particle bed fluidized by a gas containing oxygen in stoichiometric excess of that required to oxidize said substance;
   said particle bed containing particles of an alumina-containing non-refractory clay in a quantity sufficient to provide an amount of alumina in stoichiometric excess of that required to react to form aluminum sulfate from sulfur oxides formed during oxidation of said sulfur-containing substances; and
   maintaining the temperature in said fluidized particle bed at from about 1200°F. to about 1400°F. whereby said sulfur-containing substances are oxidized and sulfur oxides formed in the course of such oxidation react within the reactor particle bed with the alumina to form aluminum sulfate.

2. A method according to claim 1 in which the sulfur-containing substance to be oxidized is coal.

3. A method according to claim 1 in which the sulfur-containing substance to be oxidized is lignite.

4. A method according to claim 1 in which the sulfur-containing substance to be oxidized is oil shale.

5. A method according to claim 1 in which the sulfur-containing substance to be oxidized is tar sand.

6. A method according to claim 1 in which the sulfur-containing substance to be oxidized is peat.

7. A method according to claim 1 in which aluminum sulfate and ash is withdrawn from the reactor and additional non-refractory clay is supplied to the bed.

8. A method according to claim 1 in which the sulfur-containing substance is coal and the non-refractory clay is clay commonly or naturally associated with the coal in the coal seam.

9. A method for the oxidation of a sulfur-containing fuel of the group consisting of coal, fuel oil, natural gas, lignite, oil shale, tar sand and peat wherein the sulfur oxide content of the gaseous effluent resulting from such oxidation is reduced, said method comprising:
   introducing the fuel to be oxidized into a reactor bed of particles fluidized by a gas containing oxygen in stoichiometric excess of that required to effect oxidation of the sulfur of said fuel, said bed of particles comprising particles of alumina containing non-refractory clay in a quantity sufficient to provide a stoichiometric excess of alumina for reaction with sulfur oxides formed during oxidation of sulfur in the fuel; and
   maintaining the temperature in said bed of particles at from about 1200°F. to about 1400°F., whereby said fuel is oxidized and sulfur oxides formed in the course of such oxidation react with alumina to form aluminum sulfate.

* * * * *